Jan. 23, 1940.   W. S. POTTER   2,187,865
RADIO FREQUENCY DRIFT INDICATOR
Filed Sept. 16, 1935   3 Sheets-Sheet 1

INVENTOR.
William S. Potter.
BY
Strauch & Hoffman
ATTORNEYS

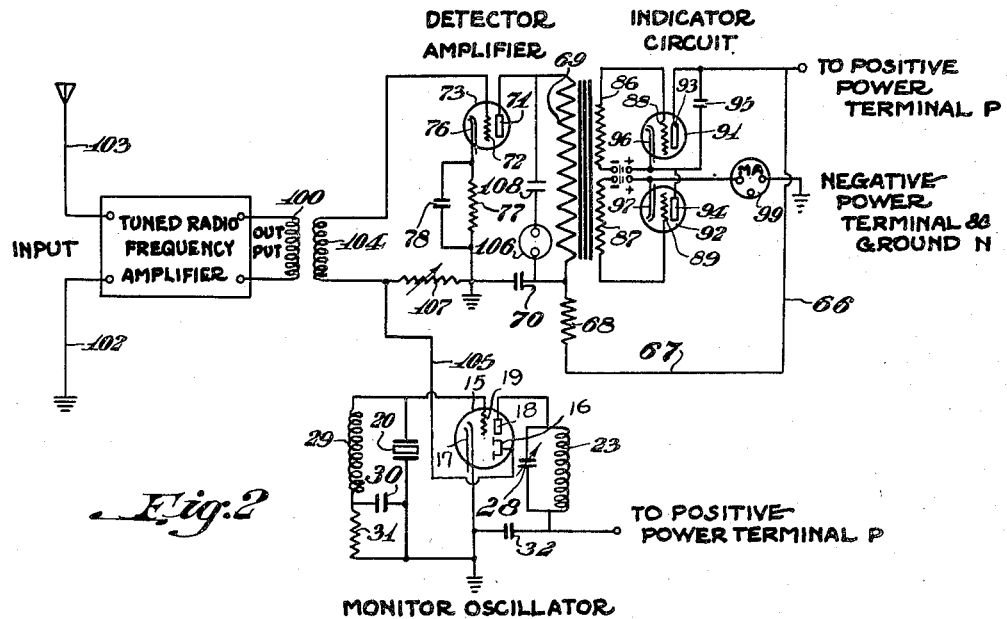

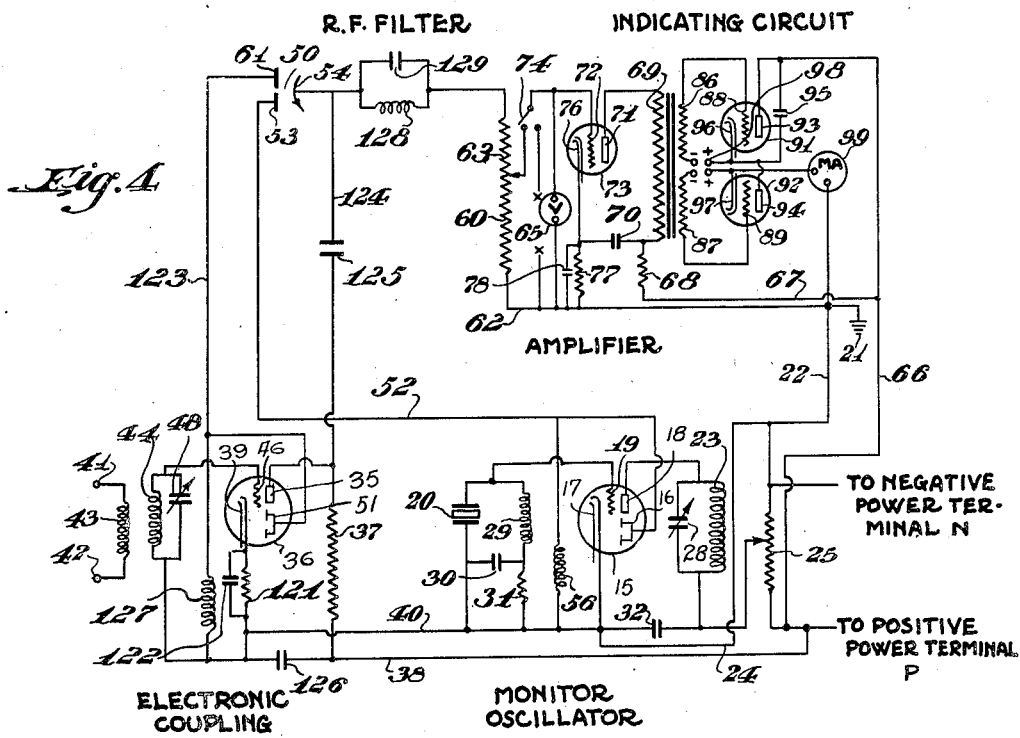

Patented Jan. 23, 1940

2,187,865

UNITED STATES PATENT OFFICE 2,187,865

RADIO FREQUENCY DRIFT INDICATOR

William S. Potter, Pittsburgh, Pa., assignor to Pittsburgh Equitable Meter Company, Pittsburgh, Pa., a corporation of Pennsylvania Application September 16, 1935, Serial No. 40,837

16 Claims. (Cl. 250—39)

The present invention relates to apparatus for comparing radio frequencies, and more specifically relates to an apparatus for determining the deviation in frequency of a radio frequency potential from an assigned value, the invention being particularly suitable for checking or monitoring the frequency of a radio broadcast transmitter station.

It is an object of the present invention to provide an apparatus for measuring or comparing the difference in frequencies between two or more radio frequency sources which is simple in construction and operation, is accurate, and is not liable to get out of order.

Another object of the invention is the provision of an apparatus for measuring the difference in frequencies between two or more radio frequency sources which is independent of variations in amplitude of the sources.

Another object is the provision of means for mixing and equalizing two radio frequency currents to develop an audio frequency beat.

Another object is the provision of a piezo-electric crystal oscillator which is independent of temperature or atmospheric pressure changes.

Another object is the provision of a frequency monitoring apparatus which may be easily checked.

A further object is the provision of a frequency checking apparatus which may be located at a point remote from the transmitter.

According to the present invention, a piezo-electric crystal vacuum tube oscillator is provided having a diode plate connected by a suitable coupling to a radio frequency circuit, and the audio frequency developed in the radio frequency circuit is measured to provide an indication or comparison of the radio frequencies. The diode plate of the oscillator audion enables coupling of the oscillator to a radio frequency circuit without disturbing the adjustment of the oscillator. Preferably the radio frequency circuit includes a vacuum tube with a diode plate and a tunable circuit connected to the diode circuit or grid circuit to which is coupled a suitable source of radio frequency potential to be measured or checked. The triode section of the vacuum tube can be employed to amplify the audio frequency beat produced in the coupling. In order to produce a maximum audio frequency beat the diode circuits of the oscillator and coupling are connected to a proportional condenser having a grounded plate, and by proper adjustment of a movable plate thereof the desired portion of the radio frequency potentials can be grounded to equalize the radio frequency potentials across the coupling.

The audio frequency beat potential may be further amplified and is impressed on a condenser controlled by a pair of thermionic valves to alternately charge and discharge the condenser. An ammeter or other suitable indicating or recording instrument indicates the average condenser charging current which is a function of the audio frequency beat potential. The charging current of the condenser is independent of the amplitude of the audio frequency potential.

The invention preferably is employed at a radio transmitter station, or, may be modified for use as a checking device in connection with a radio receiver. In either case the monitor radio frequency preferably is taken from a diode plate of the monitor oscillator audion, so that the adjustment of the monitor oscillator need not be disturbed.

The invention will be described in greater detail by way of example with reference to the accompanying drawings wherein:

Figure 1 diagrammatically shows a preferred embodiment of the invention employed in connection with a radio transmitter;

Figure 2 shows a modification employed in connection with a radio receiver for checking received frequencies;

Figure 3 shows a further modification employed at a radio receiver; and

Figure 4 is a further modification employed in connection with a radio transmitter.

Figure 1:
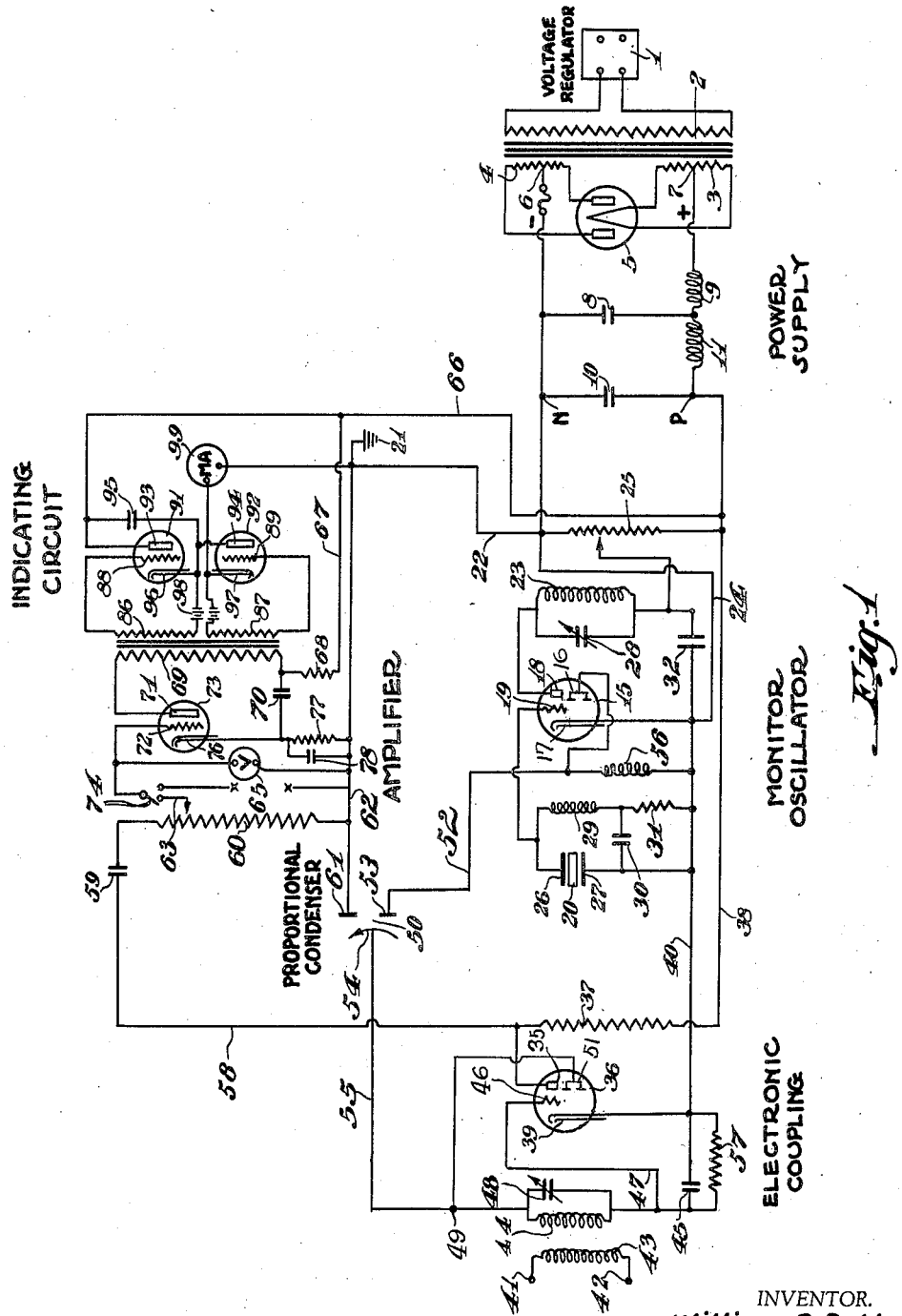

In order to simplify the description and explanation of the invention, each unit will be separately described, but it will be understood that the whole apparatus may be employed as one unit.

Power supply

A regulated alternating current from any suitable source supplied through a voltage regulator 1 is converted into direct current by means including a transformer 2 and a full wave rectifier of any suitable type. In the modification shown one secondary winding 3 of this transformer is connected to the cathode or filament of the vacuum tube rectifier 5 for heating the same, and another secondary winding 4 is connected at its terminals to the anodes or plates thereof. The secondary windings 3 and 4 are tapped at their respective centers to constitute the positive and negative direct current output terminals respectively of the rectifier. The negative terminal 6 is connected to one terminal of capacitor 8 and the positive terminal 7 is connected to one end of inductor or reactance 9, the opposite terminal of reactance 9 being connected to the other terminal of capacitor 8. The capacitor or condenser 8 and the reactance 9 together with capacitor 10 and reactance 11 provide a smoothing action to the direct current so that a non-pulsating direct current is available for application from the output points P and N.

Monitor oscillator

The monitor oscillator comprises an audion 15 of the diode-triode type having a diode plate 16, an indirectly heated cathode 17, an anode 18, a grid 19, and a piezo-electric crystal 20 of any suitable kind. The cathode 17 of the audion 15 is grounded at a common ground 21 through wires 22 and 24, and the anode 18 is maintained at a suitable positive direct current potential with relation to grounded cathode 17, through a fixed inductance 23 and an adjustable potentiometer resistance 25 connected across the terminals P and N of the power supply.

The plate circuit of audion 15 includes a tunable resonant circuit comprising the inductance 23 and a shunted adjustable tuning condenser 28. The vibrator 20, held loosely between plates 26 and 27, is connected in the grid circuit of the audion 15, and is shunted by a choke coil 29 which confines the radio frequency mainly to the grid and crystal circuit, the condenser 30 providing a return path of low reactance to ground for the radio frequency that passes through coil 29. When condenser 28 is adjusted to tune the plate circuit to approximately the natural frequency of the vibrator 20, an oscillating current will be set up at a frequency which is predetermined by the properties of the vibrator 20 and is substantially independent of the electrical variables of the circuit. Resistance 31 serves to suitably bias the grid 19 with relation to cathode 17 when the circuit is oscillating, and stop condenser 32 provides a return path to the cathode for the radio frequency current in the plate circuit. Due to a capacity effect, within tube 15, a radio frequency potential is induced in diode plate 16, this frequency being the same as the generated monitor radio frequency just mentioned, and the diode plate can be connected with the transmitter radio frequency circuit, as will hereinafter appear. This arrangement has the advantage that the monitor oscillator circuit is not disturbed by the transmitter circuit.

Vibrator 20 may be of any suitable piezo-electrical material, and I prefer to employ a quartz crystal that is ground with parallel faces in such way that its natural period of vibration is independent of temperature or barometric changes, thereby eliminating the need for surrounding the crystal by temperature or pressure control devices. The crystal and oscillator circuit are preferably so selected that the frequency of the monitor oscillator output is maintained in operation at exactly sixty cycles higher than the assigned frequency of the transmitter being monitored. As the frequency of power transmission lines is accurately maintained at sixty cycles, checking of the apparatus is thereby simplified. However, it will be understood that any other suitable frequency difference can be maintained.

Electronic coupling

The anode 35 of the audion 36 is connected through resistor 37 and wire 38 with the positive terminal P of the power supply and thus is maintained at a suitable potential with respect to the cathode 39 which is grounded by wires 40, 24 and 22 to the common ground 21.

The terminals 41 and 42 of induction winding 43 are connected to a transmission line terminated by a pick-up coil (not shown) coupled to one of the unmodulated amplifier stages in the radio frequency transmitter being monitored (not shown). The radio frequency current induced in the transmission line is coupled by coils 43 and 44 to the diode plate circuit of audion 36 which includes a tunable circuit comprising tunable condenser 48 and coil 44, capable of attaining resonance at the transmitter frequency, and flows to ground through cathode 39. The grid 46 of audion 36 is connected by wire 47 to a point of substantial zero radio frequency potential in the diode circuit, and as condenser 45 provides a return path of low reactance to ground for the radio frequency in coil 44, the grid does not carry any radio frequency potential.

Due to the presence of diode plate 16 in the audion 15, a radio frequency potential is induced in diode 16, as already explained, and flows through wire 52 and condenser plate 53 to adjustable condenser plate 54, and is conducted by wire 55 connected at 49 to the diode plate 51 and to the cathode 39 of audion 36 and thence to ground. Choke coil 56 substantially prevents flow of radio frequency current therethrough to ground. The monitor radio frequency is thus mixed with the transmitter radio frequency across diode plate 51 and cathode 39 and sets up an audio frequency beat across diode plate 51 and cathode 39 which passes through resistor 57 to the grid 46, and no radio frequency is impressed on grid 46 as the condenser 45 provides a discharge to ground for the radio frequency potentials. Thus, the grid 46 has impressed thereon an audio frequency potential equal to the beat potential, and serves to provide an amplified plate current of equal frequency in tube 36 between plate 35 and cathode 39. The plate current is conducted by wire 58 through condenser 59 which blocks direct current from the power supply terminal P, and the audio frequency current further flows through resistance 60 to ground 21.

Proportioning

The plate 61 of condenser 50 is grounded at 21 by wire 62, and a certain proportion of both the monitor and induced transmitter radio frequency currents flow to ground therethrough, the monitor current flowing from plate 53 to adjustable plate 54 and from thence to grounded plate 61, while the transmitter current flows from point 49 through wire 55 to plate 54, and thence to grounded plate 61. By properly positioning adjustable plate 54 the proportion of monitor and transmitter radio frequency currents flowing to ground therethrough is adjusted so as to equalize the monitor and transmitter radio frequency currents in the diode-cathode path. The point of proper proportioning of the radio frequency potentials is determined by setting adjustable contact 63 at any arbitrary point on resistance 60 and observing the voltmeter 65 shunted across resistance 60 as the condenser plate 54 is moved. Equal proportioning of the radio frequency potentials is indicated when the voltage of the audio frequency beat potential across voltmeter 65 is at a maximum.

Amplifier

The anode 71 of the amplifier audion 73, which is of the indirectly heated type, receives direct current potential from the power supply terminal P through wires 66 and 67, resistor 68 and primary transformer winding 69. The cathode 76 is suitably biased positive to ground by resistor 77 so that the audio frequency potential on grid 72 will always be negative thereto. The audio frequency beat potential impressed on grid 72 from the contact 63 through switch 74 produces a lineal change in amplified plate current, and condensers 70 and 78 act as by-pass capacitors providing a return path of low reactance to ground for the amplified audio frequency potential.

Indicating circuit

The anodes 93 and 94 of audions 91 and 92 respectively are connected to opposite sides of capacitor 95, and anode 93 receives a suitable direct current potential from point P through wire 66. The cathodes 96 and 97 are biased at the correct positive potential relative to the grids of their respective audions by means of suitable direct current sources 98, which may be batteries or copper oxide rectifiers. Cathode 96 of audion 91 is connected to plate 94 of audion 92 to maintain the potentials on cathode 96 and plate 94 equal. The audio frequency potential in primary coil 69 induces alternating potentials in the secondary coils 86 and 87 which are reversely connected to control the grids 88 and 89 of audions 91 and 92 respectively in such manner that the audions pass current to charge and discharge the condenser 95. When the grid 89 is positive with respect to the cathode 97 the plate-cathode current flows in audion 92 through plate 94 and cathode 97 to charge capacitor 95. On the next half cycle when the grid 88 of audion 91 becomes positive with respect to cathode 96, and grid 89 becomes negative with respect to cathode 97, the condenser 95 discharges through the plate 93 and cathode 96 of audion 91. During the charging cycle of capacitor 95 the current flow through audion 92 passes through and is indicated on milliammeter 99 and because of the oscillating charging and discharging currents this indication actually is the average charging current. The average pulsating charging current to capacitor 95 as indicated by milliammeter 99 bears a definite relation to the frequency of the audio frequency beat, and the measurement thereof indicates the frequency of the audio frequency beat.

The operations of audions 91 and 92 are such that the amplified positive and negative plate potentials are outside the potential range required to fully charge and discharge condenser 95 so that the condenser charging current is independent of the amplitude of the potential impressed on grids 88 and 89 within a wide range, and consequently is independent of the potential impressed on grid 72 which controls the potential supplied to grids 88 and 89. When the grid 88 is positive with respect to cathode 96 it consumes power, and when grid 89 is positive with respect to cathode 97 it also consumes power, the power being supplied through the transformer coupling 69, 86 and 87 by the plate circuit of amplifier audion 73. The transformer, consisting of windings 69, 86 and 87, is designed so that the impedance of the grid-cathode circuits of audions 91 and 92 as reflected in the amplifier plate circuit of audion 73 is equal to the internal plate impedance of audion 73. Under these conditions the amplified tube requires a minimum potential to provide the required power for operating the indicating circuit. This required potential is adjusted by moving the contact 63 along resistor 60 to provide the required potential for the grid 72.

Operation

Charging condenser 95 is so selected that the indicator of the milliammeter 99 is at the center of the scale where the input frequency through transformer 69, 86, 87 is sixty cycles. As the monitor oscillator is preferably operated at a fixed frequency, sixty cycles higher than the assigned transmitter frequency, any deviation of the transmitter from the assigned frequency causes a corresponding change in the frequency of the beat across diode plate 51 and cathode 39. The transmitter and monitor frequencies are properly proportioned by adjustment of condenser plate 54 which grounds a portion of the two radio frequency potentials, the point of equality being indicated when the audio frequency beat potential is at a maximum as shown by voltmeter 65. The audio frequency beat is amplified in audion 36 and is transmitted to the amplifier audion 73 where it is amplified and impressed alternately on the grids of audions 91 and 92. When grid 89 becomes positive grid 88 is negative and current from the source of potential P flows through wires 38 and 66 to condenser 95 to charge the same, the potential from the opposite plate of the condenser flowing off through tube 92 and milliammeter 99 to ground. As grid 88 is negative, no current can flow through the tube 91. On the next half cycle when grid 88 is positive and grid 89 is negative no current flows through tube 92 and the current flows through plate 93 and cathode 96 of tube 91, connected to the other plate of condenser 95 to discharge this condenser. The greater the frequency of charge and discharge of condenser 95, the greater will be the average current flowing through milliammeter 99. The change in frequency of the transmitter therefore is indicated on the milliammeter 99, an increase over the assigned frequency being indicated on one side of the scale, and a decrease being indicated on the other side. The milliammeter 99 may be calibrated to show quantitative frequency deviation or to show percentage deviation from assigned frequency.

Testing

The accuracy of the apparatus may be checked by substituting a sixty cycle low voltage test potential of suitable value for the beat frequency. This is conveniently done by cutting out potentiometer resistance 60 by means of switch 74 and connecting a low voltage secondary winding of a test transformer at points x—x in the circuit. If the indicator circuit is functioning properly the ammeter 99 should register zero deviation for the frequency of test winding.

Modifications

In Figure 2 there is shown a modification which may be employed for checking the transmitter radio frequency at a remote point. Parts of this modification corresponding to those shown in Figure 1 have the same reference numbers, and a description thereof accordingly need not be repeated. In connection with this modification it will be understood that a suitable power supply is employed, as for example, that shown in Figure 1.

Coupling coil 100 is connected in the plate circuit of a radio frequency amplifier stage of a conventional radio receiver having the usual ground connection 102 and antenna connection 103. The pick-up coil 104, which is coupled by an air gap to coupling coil 100, is connected to the grid 72 of the vacuum tube 73. The radio frequency current flowing in the diode plate circuit of the monitor oscillator passes from diode plate 16, through wire 105 and pick-up coil 104 to the grid 72 of the vacuum tube 73, thereby producing an audio frequency beat on the grid with the radio frequency from the receiver. The potential of the monitor frequency potential can be adjusted to equality with the radio frequency potential induced in pick-up coil 104 by an adjustable resistance 107 which conducts a portion of the monitor radio frequency potential to ground, the point of equality of potentials being indicated by maximum potential on the alternating current voltmeter 106 of any suitable type, direct current being blocked out by condenser 108. The voltmeter may be connected before the amplifier audion 73 but preferably is connected beyond. Resistance 77 is selected of suitable value such that the vacuum tube 73 operates as a detector with some amplification of the audio frequency potential, the amplified and detected audio frequency circulating in the path comprising plate 71, primary coil 69, and audio frequency condensers 70 to ground. Condenser 78 acts as a by-pass to provide a path of low resistance for the audio frequency potential around resistor 77 to ground. If desired, a detector audion may be employed ahead of audion 73, in which case audion 73 serves as an amplifier only, and resistor 77 is chosen at a suitable value for this purpose.

The audio frequency current in primary coil 69 induces alternating potentials 180° out of phase in the secondary coils 86 and 87, which are transmitted to the grids 88 and 89 of audions 91 and 92 respectively, as previously described, and the ammeter 98 indicates the average charging current of condenser 95, and suitably calibrated indicates the received radio frequency.

In Figure 3 a further modification is shown for checking the transmitter radio frequency at a remote point. In this modification the monitor oscillator is coupled to the input circuit of a radio receiver of conventional type. The frequency potential from diode plate 16 is coupled by adjustable coil 115 and coil 116 to the incoming signal of the radio receiver antenna, the choke coil 117 providing a return path to ground of high reactance for the diode plate potential. The mixed radio frequency potentials in coil 116 pass through a conventional radio frequency amplifier and detector circuit, the radio frequencies being detected and reduced to an audio frequency beat. Coupling coils 118 and 119 coupled by an iron core pick up the audio frequency beat which is conducted to the grid 72 of amplifier audion 73. In this audion the audio frequency is amplified and circulates in the plate circuit of the tube as previously described. By proper adjustment of coil 115 the radio frequency potential of the monitor oscillator can be adjusted to equality with the incoming frequency of the receiver, the point of equality being indicated by maximum potential on alternating voltmeter 106. The amplified audio frequency potential passes through primary winding 69 and induces alternating potentials 180° out of phase in the secondary windings 86 and 87 which are transmitted to the grids 88 and 89 respectively of the audions 91 and 92. The milliammeter 99 in this modification similarly indicates the average charging current for condenser 95, and properly calibrated the received radio frequency.

In Figure 4 there is shown a further modification for monitoring the transmitter frequency at the transmitter, parts of this modification corresponding to those shown in Figure 1 having the same reference numerals. In this modification the electronic coupling operates in a modified manner. The resistance 121 suitably biases the cathode 39 so that the audion 36 acts as an amplifier for the transmitter radio frequency potential which is impressed on grid 46, the amplified plate current flowing through load resistor 37 and condenser 126 to ground at 40. Condenser 126 blocks the direct current potential from conductor 38 to cathode 39. The diode plate 51 in the tube 36 receives the unknown radio frequency potential due to the capacity effect which is blocked by choke coil 127 and accordingly is conducted by wire 123 to condenser plate 61 across condenser 50 to condenser plate 54 and thence by wire 124 and condenser 125, resistor 37 and condenser 126 to ground. The monitor oscillator radio frequency potential from diode plate 16 is blocked by choke coil 56 and thus flows through wire 52 to condenser plate 53, across condenser 50 to condenser plate 54 and thence by wire 124, condenser 125 resistor 37, and condenser 126 to ground. As the radio frequency potentials of diode plate 51 and of diode plate 16 are carried by the plate circuit of audion 36, consisting of conductor 124 and condenser 125, there will be produced in this circuit an audio frequency beat. Both the audio frequency beat potential as well as the radio frequency potentials will be conducted by conductor 124 and condenser 125 to the radio frequency filter comprising inductance 128 and condenser 129, which are properly selected and tuned to absorb the radio frequency potentials and to permit the audio frequency potential to pass through to the resistor 60 to ground. The audio frequency beat potential is impressed on grid 72 of audion 73 as previously described, the rest of the circuit being the same as shown in Figure 1. Where in the specification and claims I use the term diode-triode vacuum tube, it will be understood that a diode-pentode or any other similar type of tube having a diode-triode system may be employed.

The invention may be embodied in other specific forms without departure from the spirit or essential characteristics of the present invention. The specific form described herein therefore is to be considered in all respects as illustrative and not restrictive of the invention.

What is claimed and desired to be secured by United States Letters Patent is:

1. In a frequency monitoring system, a monitor oscillator for generating oscillations having a radio frequency differing from an assigned frequency by a predetermined amount equal to the frequency of a commercial alternating current, means for combining oscillations generated by said oscillator with received oscillations of which the frequency is to be monitored to produce an audio frequency beat corresponding to said predetermined frequency when the frequency to be monitored is at its assigned value, and means to show the value of the audio frequency beat produced.

2. In a frequency metering system, a monitor oscillator for generating oscillations having a radio frequency differing from an assigned frequency by a predetermined amount equal to the frequency of a commercial alternating current, means for combining oscillations generated by said oscillator with received oscillations of which the frequency is to be monitored to produce an audio frequency beat corresponding to said predetermined frequency when the frequency to be monitored is at its assigned value, a pair of thermionic valves, means for impressing the beat frequency potential out of phase on the grids of said thermionic valves, a condenser connected to and alternately charged and discharged by said thermionic valves, and means to indicate or record the condenser current as a function of the audio frequency beat produced.

3. A frequency metering system as specified in claim 2 wherein the potential range of the condenser charging and discharging currents are maintained outside of the potential range required to fully charge and discharge the condenser.

4. In a frequency measuring system, a circuit responsive to unknown frequencies to be measured and including a thermionic valve having a diode portion including a diode plate receiving an oscillating potential of said unknown frequency; an oscillator circuit adapted to generate a predetermined substantially constant frequency and including a dual function thermionic valve having a triode portion and a diode portion, said triode portion forming a part of the oscillator circuit and said last named diode portion being coupled to said oscillator circuit within said valve to receive an oscillating potential of said constant frequency on its diode plate; means connecting the diode plates of said diode portions to produce a beat frequency in said first named valve, and means to measure said beat frequency.

5. A frequency measuring system comprising, a circuit tuneable to resonance with a radio frequency to be measured and including a thermionic valve having a diode portion including a diode plate receiving an oscillating potential of said radio frequency; means for coupling a radio frequency to be measured to said tuneable circuit; an oscillator circuit adapted to generate a predetermined substantially constant frequency differing from said radio frequency and including a dual function thermionic valve having a triode portion and a diode portion, said triode portion forming a part of the oscillator circuit and said last named diode portion being coupled to said oscillator circuit within said tube to receive an oscillating potential of said constant frequency on its diode plate; means connecting the diode plates of said valves to produce audio frequency beats in said first named valve, and means to measure said audio frequency beats.

6. In a frequency measuring system, a circuit responsive to a frequency to be measured and including a thermionic valve having a diode portion including a diode plate receiving an oscillating potential of the frequency to be measured; an oscillator including a dual function thermionic valve having a triode portion and a diode portion, said oscillator being adapted to generate a predetermined substantially constant frequency differing from the frequency to be measured, said triode portion forming a part of the oscillator circuit and said diode portion being coupled to said constant frequency within said valve to receive an oscillating potential of said constant frequency on its diode plate; means connecting the diode plates of said valves to develop a beat frequency in said first named valve; and means for measuring said beat frequency comprising, a pair of thermionic valves, means for impressing the beat frequency potential out of phase on the grids of said pair of valves, a condenser connected to said thermionic valves and alternately charged and discharged thereby, and means to indicate or record the condenser current as a function of the frequency beat.

7. In a frequency measuring system, a circuit for generating an oscillating potential of substantially constant frequency, a circuit responsive to an unknown frequency to be measured which differs from said constant frequency, means coupling said circuits and responsive to said frequencies to develop a frequency beat, means comprising a three plate proportional condenser for varying the potentials of said first two frequencies to vary the amplitude of said beat frequency, and means responsive to average beat frequency current for measuring said beat frequency to indicate the value of an unknown frequency.

8. In a frequency measuring system, a circuit for generating an oscillating potential of substantially constant frequency, a circuit responsive to a frequency to be measured which differs from said constant frequency, means coupling said circuits and responsive to said frequencies to develop a frequency beat, means comprising a proportional condenser for varying the potentials of said first two frequencies to vary the amplitude of said beat frequency, and means for measuring said beat frequency.

9. A frequency measuring system comprising a circuit tuneable to resonance with the frequency to be measured and embodying a thermionic valve, means for coupling a radio frequency potential to be measured to said tuneable circuit, an oscillator having a predetermined substantially constant frequency and embodying a thermionic valve, means to couple said circuit and oscillator to develop a frequency beat, a multiple plate condenser, a diode plate in said first thermionic valve coupled to one plate of said condenser, a diode plate in the second thermionic valve and coupled to another plate of said condenser, a means to measure the beat frequency.

10. A frequency measuring system comprising a circuit tuneable to resonance with the frequency to be measured and embodying a thermionic valve, means for coupling a radio frequency potential to be measured to said tuneable circuit, an oscillator having a predetermined substantially constant frequency and embodying a thermionic valve, means to couple said circuit and oscillator to develop a frequency beat, a multiple plate condenser, a diode plate in said first thermionic valve and coupled to one plate of said condenser, a diode plate in the second thermionic valve and coupled to another plate of said condenser, and means to measure the beat frequency coupled to a third plate of said condenser.

11. A frequency measuring system comprising a circuit tuneable to resonance with a frequency to be measured embodying a thermionic valve, means for coupling a radio frequency potential to be measured to said tuneable circuit, an adjustable proportioning condenser, a diode plate in the thermionic valve and coupled to one plate of said condenser, an oscillator having a predetermined substantially constant frequency embodying a thermionic valve, a diode plate in the second thermionic valve and coupled to another plate of said condenser, said diode circuits being coupled in a manner to develop a beat frequency, a pair of thermionic valves, means for impressing said beat frequency on the grids of said pair of thermionic valves substantially one hundred eighty degrees out of phase, means connecting said thermionic valves to alternately charge and discharge said second condenser, and means to indicate the current of said second condenser as a function of the frequency beat.

12. A frequency measuring system comprising a tuneable circuit embodying a thermionic valve, means for coupling a radio frequency potential to be measured to said tuneable circuit, an adjustable proportioning condenser, a diode plate in said thermionic valve coupled to one plate of said condenser, an oscillator having a predetermined substantially constant frequency embodying a thermionic valve, a diode plate in the second thermionic valve and coupled to another plate of said condenser, said diode plates being coupled in a manner to develop a beat frequency potential, a pair of thermionic valves, means including a radio frequency filter coupled to an adjustable plate of said condenser for impressing said beat frequency potential on the grids of said pair of thermionic valves one hundred eighty degrees out of phase, a second condenser coupled to said thermionic valves and alternately charged and discharged thereby, and means to indicate or record the second condenser charging current as a function of the frequency beat.

13. In a frequency monitoring system, a source of commercial alternating current having a predetermined audio frequency, a monitor oscillator deriving its power from said alternating current source and generating oscillations having a radio frequency differing from an assigned frequency by said predetermined frequency, and means for combining oscillations generated by said oscillator with received oscillations of which the frequency is to be monitored to produce an audio frequency beat corresponding to the frequency of said alternating current source when the frequency to be monitored is at its assigned value.

14. In a frequency measuring system, a circuit responsive to a frequency to be measured and including a thermionic valve having a diode portion including a diode plate for receiving an oscillating potential of the frequency to be measured; an oscillator including a dual function thermionic valve having a triode portion and a diode portion, said oscillator being adapted to generate a predetermined substantially constant frequency differing from the frequency to be measured, said triode portion forming a part of the oscillator circuit and said diode portion being coupled to said constant frequency within said valve to receive an oscillating potential of said constant frequency on its diode plate; means connecting the diode plates of said valves to develop a beat frequency in said first named valve; and means for measuring said beat frequency comprising, a first thermionic valve, means for impressing the beat frequency potential on the grid of said first thermionic valve, a condenser connected to and discharged by said first thermionic valve, a second thermionic valve to discharge said condenser, and means to indicate or record the condenser current as a function of the frequency beat.

15. A frequency measuring system, comprising a circuit for receiving an unknown frequency to be measured; an oscillator circuit adapted to generate a predetermined substantially constant frequency and including a dual function thermionic valve having a triode portion and a diode portion, said triode portion forming a part of the oscillator circuit and said diode portion being coupled to said oscillator circuit within said valve to receive an oscillating potential of said constant frequency on its diode plate; means for combining said constant frequency oscillating potential of said diode plate with the unknown frequency of said receiving circuit to produce a beat frequency; and means to measure said beat frequency.

16. A frequency measuring system, comprising a circuit for receiving an unknown frequency to be measured; an oscillator circuit adapted to generate a predetermined substantially constant frequency and including a dual function thermionic valve having a triode portion and a diode portion, said triode portion forming a part of the oscillator circuit and said diode portion being coupled to said oscillator circuit within said valve to receive an oscillating potential of said constant frequency on its diode plate; means for combining said constant frequency oscillating potential of said diode plate with the unknown frequency of said receiving circuit to produce a beat frequency; and means to measure said beat frequency, said last-named means comprising, a pair of thermionic valves, means for impressing the beat frequency potential out of phase on said pair of valves, a condenser connected to said thermionic valves and alternately charged and discharged thereby, and means to indicate or record the condenser current as a function of the frequency beat.

WILLIAM S. POTTER.